United States Patent
Ha

(10) Patent No.: US 7,868,946 B2
(45) Date of Patent: Jan. 11, 2011

(54) ADAPTIVE MOTION COMPENSATED INTERPOLATING METHOD AND APPARATUS

(75) Inventor: Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1298 days.

(21) Appl. No.: 10/960,494

(22) Filed: Oct. 8, 2004

(65) Prior Publication Data

US 2005/0129124 A1 Jun. 16, 2005

(30) Foreign Application Priority Data

Dec. 10, 2003 (KR) .................. 10-2003-0089365

(51) Int. Cl.
*H04N 7/12* (2006.01)
*H04N 11/02* (2006.01)
*H04N 11/04* (2006.01)

(52) U.S. Cl. ............... 348/416.1; 348/452; 348/699

(58) Field of Classification Search ......... 348/699–700, 348/413, 416, 407, 441, 459, 451–452; 382/300, 382/173–174, 236; *H04N 7/12, 11/02, 11/04*
See application file for complete search history.

(56) References Cited

U.S. PATENT DOCUMENTS 5,214,751 A * 5/1993 Robert ..................... 345/606
5,394,196 A * 2/1995 Robert ..................... 348/699
5,612,745 A     3/1997 Ozcelik
6,480,632 B2 * 11/2002 Martins et al. ............. 382/300
6,625,333 B1 *  9/2003 Wang et al. ............... 382/300

FOREIGN PATENT DOCUMENTS

KR     10-292474     3/2001

OTHER PUBLICATIONS

Korean Office Action issued Oct. 27, 2005, for KR 2003-89365.

* cited by examiner

*Primary Examiner*—Trang U Tran
(74) *Attorney, Agent, or Firm*—Stanzione & Kim, LLP

(57) ABSTRACT

A motion compensated interpolating method of adaptively generating a frame to be obtained by interpolating two frames according to features of a motion vector and an apparatus therefor. The adaptive motion compensated interpolating method includes estimating motion vectors (MV) by performing block-based motion estimation (ME) between adjacent frames, calculating gradients of the estimated MVs, classifying pixels of the adjacent frames into a plurality of image regions according to the gradients of the estimated MVs, and determining pixel values to be obtained by interpolating the adjacent frames by adaptively selecting pixels matched between the adjacent frames or the MV estimated between the adjacent frames for each classified image region.

13 Claims, 3 Drawing Sheets

US 7,868,946 B2

ADAPTIVE MOTION COMPENSATED INTERPOLATING METHOD AND APPARATUS

CROSS-REFERENCE TO RELATED APPLICATIONS

This application claims the priority of Korean Patent Application No. 2003-89365, filed on Dec. 10, 2003, in the Korean Intellectual Property Office, the disclosure of which is incorporated herein in its entirety by reference.

BACKGROUND OF THE INVENTION

1. Field of the Invention

The present general inventive concept relates to a frame rate conversion system, and more particularly, to a motion compensated interpolating method of adaptively generating a frame to be obtained by interpolating two frames according to features of a motion vector and an apparatus therefor.

2. Description of the Related Art

Commonly, in personal computers (PCs) or high definition televisions (HDTVs), frame rate conversion is performed for compatibility of programs with various broadcast signal standards such as PAL or NTSC. The frame rate conversion indicates that the number of frames output per second is converted. In particular, in a case where a frame rate increases, a process of interpolating new frames is necessary. Meanwhile, lately, the frame rate conversion is performed after image data is compressed using an image compression method such as a moving picture experts group (MPEG) standard or H.263. In image processing methods, since the autocorrelation of most image signals is great, they contain a large amount of redundancy. Therefore, a data compression effect can be improved by removing redundancy when data compression is performed. To efficiently compress video frames that change with respect to time, it is necessary to remove temporal redundancy. That is, by substituting a motionless frame or a frame in which a small motion exists with a previous frame, the amount of data to be transmitted can be dramatically reduced. Motion estimation (ME) involves looking for most similar blocks between a previous frame and a current frame. A motion vector (MV) indicates how far a block is moved by the ME.

In general, an ME method uses a block matching algorithm (BMA) that considers motion accuracy, real-time processing possibility, and hardware realization. A frame inserted between two frames is mainly generated using the BMA. FIG. 1 is a diagram illustrating an interpolating method suitable for compensating for a motion between frames using the BMA.

Referring to FIG. 1, if pixel values of blocks B included in a frame $F_n$, a frame $F_{n-1}$, and a frame $F_i$ are called $f_n$, $f_{n-1}$, and $f_i$, respectively, and a coordinate value belonging to the frame $F_n$ is x, an image signal to be obtained by interpolation using motion compensation can be represented as Equation 1.

$$f_i(x+MV(x)/2)=\{f_n(x)+f_{n-1}(x+MV(x))\}/2 \quad \text{[Equation 1]}$$

However, between the frame $F_n$ and the frame $F_{n-1}$, the shape or size of an object is modified by a horizontal, perpendicular, rotational, magnifying, or reducing movement of the object, or the object often disappears or appears. Therefore, since there is a high possibility that images in two blocks matched by the BMA are different, there is a high possibility that a distortion or a blurring effect is generated in the image signal obtained by the Equation 1.

To resolve the above problem, pixel values to be obtained by interpolating the two frames is determined using either the block included in the frame $F_n$ or the block included in the frame $F_{n-1}$ as shown in Equation 2. However, in an interpolating method using Equation 2, it is not clear which one of the blocks included in the frame $F_n$ and the frame $F_{n-1}$ is used.

$$f_i(x+MV(x)/2)=f_n(x) \text{ or } f_{n-1}(x+MV(x)) \quad \text{[Equation 2]}$$

Also, when the ME is performed using two adjacent frames, a covered region and an uncovered region appear in a boundary between a background and a moving object. At this time, if the ME is performed in only one direction between the two frames, a hole and an overlap are generated in a frame to be obtained by interpolation due to the covered region. Therefore, in order to prevent the hole and the overlap from being generated, the frame $F_i$ to be obtained by interpolation is generated using bi-directional ME. However, since a motion must be estimated in two directions in the bi-directional ME method, an amount of computation increases and a volume of hardware also increases.

SUMMARY OF THE INVENTION

In order to solve the foregoing and/or other problems, it is an aspect of the present general inventive concept to provide an adaptive motion compensated interpolating method of adaptively performing an motion compensated interpolation according to a gradient of a motion vector to improve deterioration of quality in a picture due to block-based motion estimation, and an apparatus therefor.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an adaptive motion compensated interpolating method comprising estimating motion vectors (MV) by performing block-based motion estimation (ME) between adjacent frames, calculating gradients of the estimated MVs, classifying pixels of the adjacent frames into a plurality of image regions according to the gradients of the estimated MVs, and determining pixel values to be obtained by interpolating the adjacent frames by adaptively selecting the pixels matched between the adjacent frames or the MV estimated between the adjacent frames for each classified image region.

The foregoing and/or other aspects and advantages of the present general inventive concept may also be achieved by providing an adaptive motion compensated interpolating apparatus comprising a frame buffer which stores a predetermined number of frames of an input image signal, an ME unit which performs one directional ME between an $(n-1)^{th}$ frame and an $n^{th}$ frame stored in the frame buffer, an MV gradient detector which detects gradients of MVs estimated by the ME unit, and a motion compensated (MC) interpolator which generates pixel values to be obtained by interpolating the two frames by classifying pixels of the two frames into a plurality of image regions according to the MV gradients detected by the MV gradient detector and determining weights of pixels matched between the frames for each image region.

A computer readable medium encoded with processing instructions for implementing an adaptive motion compensated interpolating method performed by a computer, the method comprising estimating motion vectors by performing block-based motion estimation between adjacent frames, calculating gradients of the estimated motion vectors, classifying pixels of each of the adjacent frames into a plurality of image regions according to the gradients of the estimated motion vectors, and determining pixel values to be obtained by interpolation between the adjacent frames by adaptively selecting pixels matched between the adjacent frames for each classified image region.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
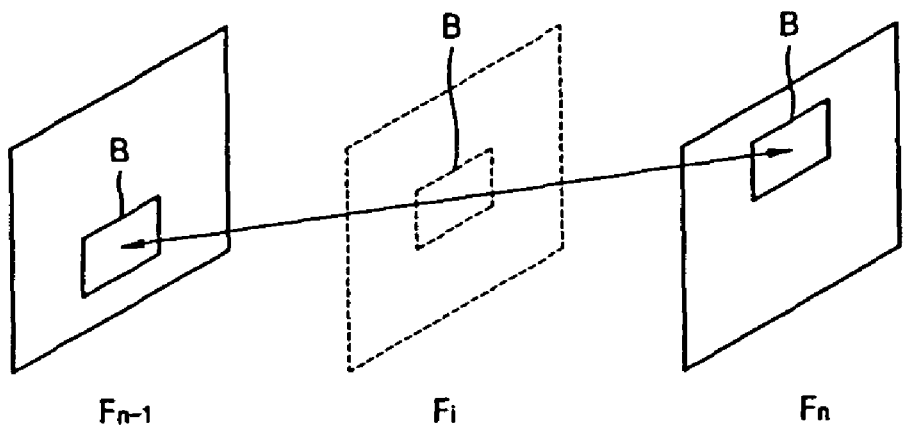
FIG. 1 is a diagram illustrating a conventional motion compensated interpolating method.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
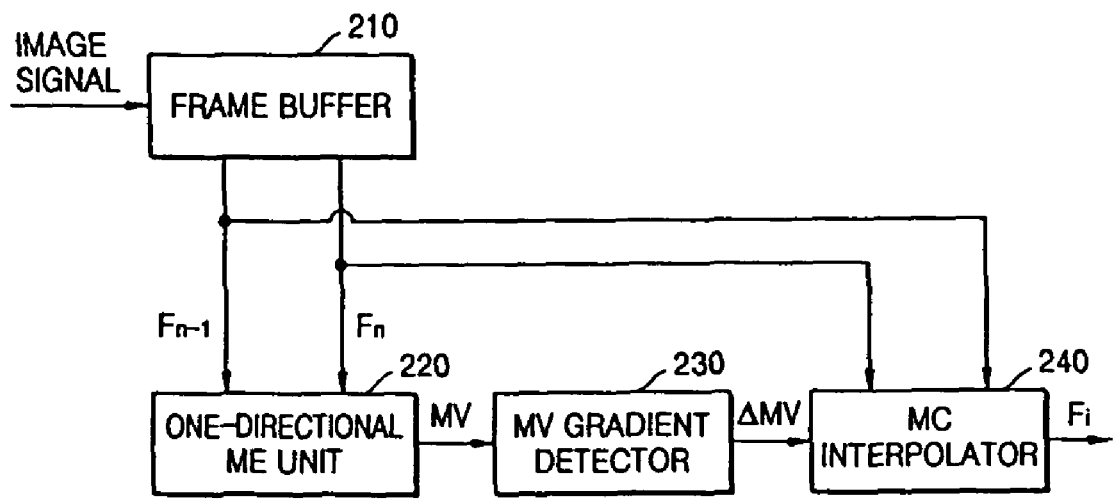
FIG. 2 is a block diagram illustrating an adaptive motion compensated interpolating apparatus according to an embodiment of the present general inventive concept.

FIG. 2 is a block diagram illustrating an adaptive motion compensated interpolating apparatus according to an embodiment of the present general inventive concept.

Referring to FIG. 2, a frame buffer 210 can store an input image signal in a unit of a frame.

A one-directional ME unit 220 can perform backward or forward ME using an $(n-1)^{th}$ frame $F_{n-1}$ and an $n^{th}$ frame $F_n$ stored in the frame buffer 210 to generate MVs.

An MV gradient detector 230 can detect gradients of the MVs generated from the ME unit 220.

An MC interpolator 240 can generate pixel values to be obtained by interpolating the frames $f_{n-1}$ and $f_n$ by determining weights of pixels matched between the frames $f_{n-1}$ and $f_n$ according to the MV gradients ($\Delta$MV) detected by the MV gradient detector 230.

Figure 3:
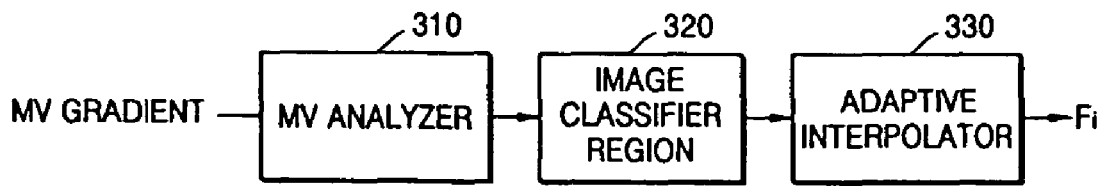
FIG. 3 is a detailed block diagram illustrating an MC interpolator shown in FIG. 2.

FIG. 3 is a detailed block diagram illustrating the MC interpolator 240 shown in FIG. 2.

Referring to FIGS. 2 and 3, an MV analyzer 310 can analyze the MV gradients detected by the MV gradient detector 230.

An image region classifier 320 can classify an image signal into either one of a uniform region, a non-uniform region, an uncovering region, and an occlusion region according to the MV gradients analyzed by the MV analyzer 310.

An adaptive interpolator 330 can generate a frame $F_i$ to be obtained by interpolation between the $(n-1)^{th}$ frame $f_{n-1}$ and the $n^{th}$ frame $f_n$ by adaptively selecting pixels matched between the two frames $f_{n-1}$ and $f_n$, the MV estimated between the two frames $f_{n-1}$ and $f_n$, or at least another MV allocated to adjacent pixels according to the image regions classified by the image region classifier 320.

Figure 4:
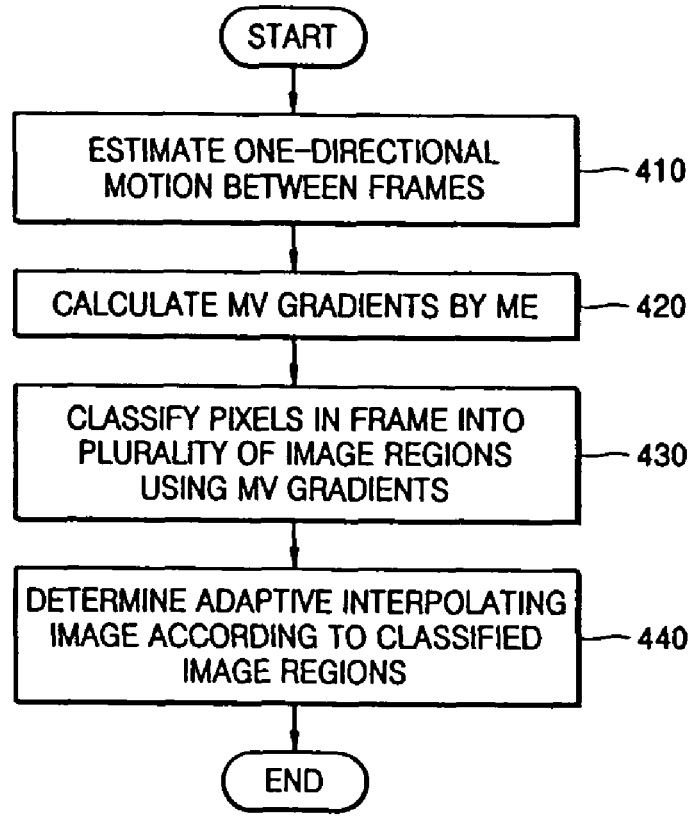
FIG. 4 is a flowchart of an adaptive motion compensated interpolating method according to another embodiment of the present general inventive concept.
Figure 5:
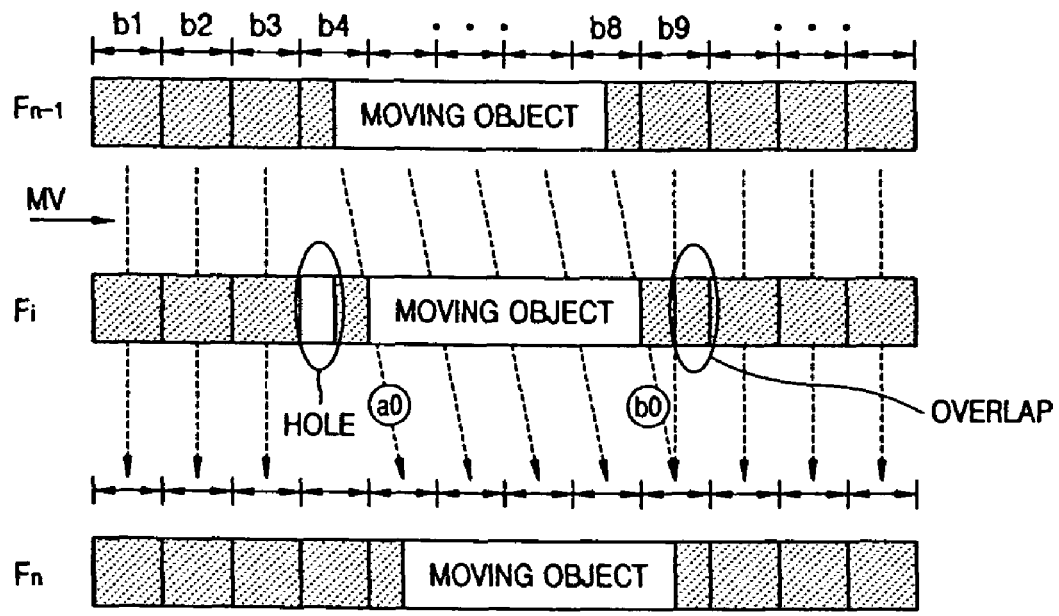
FIG. 5 is a timing diagram illustrating a conventional motion compensated interpolating method using block-based motion estimation.
Figure 6:
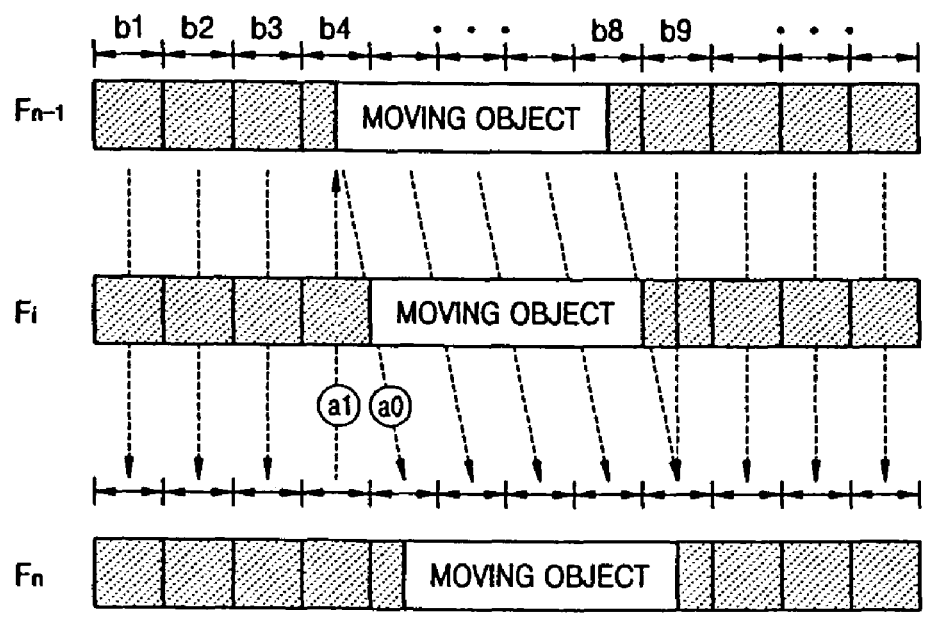
FIG. 6 is a timing diagram illustrating an adaptive motion compensated interpolating method according to another embodiment of the present general inventive concept.

FIG. 4 is a flowchart illustrating an adaptive motion compensated interpolating method according to another embodiment of the present general inventive concept, FIG. 5 is a timing diagram illustrating a conventional motion compensated interpolating method using block-based motion estimation, and FIG. 6 is a timing diagram illustrating an adaptive motion compensated interpolating method according to another embodiment of the present general inventive concept Referring to FIGS. 4 through 6, a block-based MV can be estimated by performing backward ME between an $(n-1)^{th}$ frame $f_{n-1}$ and an $n^{th}$ frame $f_n$ in operation 410. $F_i$ is a frame to be obtained by interpolating the frames $F_{n-1}$ and $F_n$, and b1 through b9 indicate unit blocks on which ME is performed. A dotted line arrow mark a0 through b0 indicates a direction of an MV.

In FIG. 5, a block b4 includes a boundary region of a moving object. When the object is moved to the right, a hole is generated in the frame $F_i$ to be obtained by interpolation. Likewise, a block b8 includes another boundary region of the moving object. When the moving object is moved to the right, an overlap is generated in the frame $F_i$ to be obtained by interpolation.

MV gradients can be calculated using the MVs obtained by the ME in operation 420. Referring to FIG. 5, directions of the MVs are maintained, but the MV gradient is changed in the boundary regions.

Image regions to which blocks including the boundary regions belong can be estimated by detecting the MV gradients in operation 430. For example, for an image classification, a first MV gradient ($\Delta MV1(b_i)$) and a second MV gradient ($\Delta MV2(b_i)$) can be calculated, wherein $\Delta MV1(b_i)=MV(b_{i-1})-MV(b_i)$, $\Delta MV2(b_i)=MV(b_{i-1})-MV(b_{i+1})$, $MV(b_i)$ indicates an MV estimated in a block $b_i$ of FIG. 6, and i indicates a spatial order of each block. Also, $\Delta MV1(b_i)$ can be used for determining the image regions to which the blocks including the boundary regions belong, and $\Delta MV2(b_i)$ can be used as a reference to determine uniform regions to increase accuracy.

TABLE 1

| $b_i$ | b1 | b2 | b3 | b4 | b5 | b6 | b7 | b8 | b9 | b10 | b11 | b12 |
|---|---|---|---|---|---|---|---|---|---|---|---|---|
| $MV(b_i)$ | 0 | 0 | 0 | +V | +V | +V | +V | +V | +V | 0 | 0 | 0 |
| $\Delta MV1(b_i)$ | | 0 | 0 | $-V$ | 0 | 0 | 0 | 0 | 0 | +V | 0 | 0 |
| $\Delta MV2(b_i)$ | | 0 | $-V$ | $-V$ | 0 | 0 | 0 | 0 | +V | +V | 0 | |

Referring to Table 1, when $\Delta MV1(b_i)$ is $-V$, that is, when $\Delta MV1(b_i)$ is a minus value, a hole is generated, and when $\Delta MV1(b_i)$ is +V, that is, when $\Delta MV1(b_i)$ is a plus value, an overlap is generated.

Therefore, according to a calculation result of $\Delta V1(b_i)$ and $\Delta MV2(b_i)$ based on Table 1, the blocks are classified as follows:

1. $\Delta MV1(b_i)=0$ and $\Delta MV2(b_i)=0$: a uniform region;
2. $\Delta MV1(b_i)=0$ and $\Delta MV2(b_i)\neq 0$: a non-uniform region;
3. $\Delta MV1(b_i)>0$: an uncovering region;
4. $\Delta MV1(b_i)<0$: an occlusion region.

Here, the uniform region corresponds to a background image, which rarely moves.

A new image signal is obtained by performing adaptive interpolation with respect to each of the classified image regions in operation 440. A frame obtained by interpolating two frames with respect to each of the classified image regions can be represented as Equation 3.

$$f_i(x+V_c/2)=\alpha f_{n-1}(x)+(1-\alpha)f_n(x+V_c) \quad \text{[Equation 3]}$$

Here, $f_i(X)$ indicates image pixels obtained by interpolation, $f_{n-1}(X)$ indicates pixels in the frame $F_{n-1}$, $f_n(X)$ indicates pixels in the frame $F_n$, X is a spatial coordinate (x, y), $V_c$ is an MV obtained by ME from the frame $F_{n-1}$ to the frame $F_n$, and $\alpha$ is an adaptive coefficient determined according to the MV gradients.

A value of the adaptive coefficient ($\alpha$) applied to Equation 3 depends on the classification of an image region as indicated below:
1. $\alpha=0.5$: the uniform region;
2. $\alpha=1$: the non-uniform region and the uncovering region;
3. $\alpha=0$: the occlusion region.

When motion compensated interpolation is performed with respect to different regions, in the uniform region, it is regarded that the images of two frames estimated using ME are almost the same. Therefore, pixel values in a frame to be obtained by interpolation in the uniform region can be calculated with $\frac{1}{2}\{f_{n-1}(X)+f_n(X+V_c)\}$ by applying "$\alpha=0.5$."

In the non-uniform region and the uncovering region, when images of two frames are averaged, the averaged image is distorted since the accuracy of an MV estimated using ME is low. Therefore, pixel values in the frame to be obtained by interpolation in the non-uniform region and the uncovering region can be calculated using only an image of the reference frame, $F_{n-1}$. That is, the pixel values in the frame to be obtained by interpolation in the non-uniform region and the uncovering region can be calculated with $f_{n-1}(X)$ by applying "$\alpha=1$."

Also, a block of the frame $F_n$ corresponding to the block b4 of frame $F_{n-1}$ is not in the occlusion region. The image of the frame $F_n$ in the occlusion region in which blocks are occluded can include more information than the image of the frame $F_{n-1}$ includes. Therefore, pixel values in the frame to be obtained by interpolation in the occlusion region in which blocks are occluded are calculated using the pixels in the frame $F_n$. That is, the pixel values in the frame to be obtained by interpolation in the occlusion region are calculated with $f_n(X+V_c)$ by applying "$\alpha=0$."

However, the hole generated in the frame obtained by interpolating two frames due to the occlusion region is allowed to remain as it is not interpolated even if the pixels in the frame $F_n$ are used, as shown in FIG. 5.

Accordingly, an interpolating method suitable for removing the hole using one directional ME is described with reference to FIG. 6.

Referring to FIGS. 4 and 6, a backward MV of a block b4 of the frame $F_{n-1}$ is the same as an MV allocated to a previous block b3 disposed adjacent to the block b4 of the frame $F_{n-1}$. That is, an MV of a block corresponding to an object can be the same as an MV of an adjacent left block if the object moves in a horizontal direction, and a backward MV of a block b4 corresponding to the object can be the same as an MV of an adjacent upper block if the object moves in a vertical direction. In FIG. 6, the hole generated due to the block b4 can be restored using an MV a0 obtained by the ME and an MV a1 allocated to the previous block b3 disposed adjacent to the block b4 of the frame $F_{n-1}$. For example, the MV a1 can be the same as a backward MV corresponding to an MV of the adjacent block b3 of the frame $F_{n-1}$.

Therefore, a frame in which the hole is restored using only the one directional ME can be represented as Equation 4.

$$f_i(x+V_p/2)=f_n(x+V_p) \quad \text{[Equation 4]}$$

Here, $V_p$ is an MV allocated to an adjacent block, such as a left block or an upper block adjacent to a block corresponding to the occlusion region. At this time, after horizontal and vertical components of the MV of the adjacent block are compared, the MV $V_p$ can be selected as an MV of a block of the same direction as that of a greater component.

The general inventive concept can also be embodied as computer readable codes recorded on a computer readable recording medium. The computer-readable medium can include a computer-readable recording medium. The computer readable recording medium can be any data storage device that can store data, which can be thereafter read by a computer system. Examples of the computer readable recording media include read-only memory (ROM), random-access memory (RAM), CD-ROMs, magnetic tapes, hard disks, floppy disks, flash memories, and optical data storage devices.

As described above, according to the present general inventive concept, deterioration of quality in a picture due to block-based motion estimation can be improved by adaptively performing motion compensated interpolation according to a gradient of a motion vector, and more particularly, a hole generated due to a region occluded behind a moving object when frame interpolation is performed, can be restored using an MV allocated to an adjacent block.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An adaptive motion compensated interpolating method comprising:
   estimating motion vectors (MV) by performing block-based motion estimation (ME) between adjacent frames with a motion estimation apparatus;
   calculating gradients of the estimated MVs with a gradient calculation apparatus;
   classifying pixels of each of the adjacent frames into a plurality of image regions according to the gradients of the estimated MVs and estimating the image region to which the pixels belong with an image classifier apparatus; and
   determining pixel values to be obtained by interpolation between the adjacent frames by adaptively selecting pixels of the adjacent frames and the MVs estimated between the adjacent frames according to each classified image region with a motion compensated interpolation apparatus.

2. The method of claim 1, wherein the estimating of the MVs comprises performing the ME in one direction.

3. The method of claim 1, wherein the calculating of the gradients of the estimated MVs comprises calculating a difference between MVs allocated by the ME of adjacent blocks in a frame, as the MV gradient.

4. The method of claim 1, wherein the calculating of the gradients of the estimated MVs comprises calculating a first MV gradient $\Delta MV1(b_i)=MV(b_{i-1})-MV(b_i)$ and a second MV gradient $\Delta MV2(b_i)=MV(b_{i-1})-MV(b_{i+1})$ where i indicates a block order in the frame, as the MV gradient.

5. The method of claim 1, wherein the classifying of the pixels comprises determining a uniform region when $\Delta MV1(b_i)=0$ and $\Delta MV2(b_i)=0$, a non-uniform region when $\Delta MV1(b_i)=0$ and $\Delta MV2(b_i)\neq 0$, an uncovering region when $\Delta MV1(b_i)>0$, and an occlusion region when $\Delta MV1(b_i)<0$.

6. The method of claim 1, wherein the determining of the pixel values comprises generating the pixel values in a frame to be obtained by interpolation with $\frac{1}{2}\{f_{n-1}(X)+f_n(X+V_c)\}$ if pixels in the adjacent frames are included in the uniform region, and generating the pixel values in the frame to be obtained by interpolation with $f_{n-1}(X)$ if the pixels in the adjacent frames are included in the non-uniform region and the uncovering region, and generating the pixel values in the frame to be obtained by interpolation with $f_n(X+V_c)$ and $f_n(X+V_p)$ if the pixels in the adjacent frames are included in the occlusion region, where $f_{n-1}(X)$ represents pixels of an $(n-1)^{th}$ frame, $f_n(X)$ represents pixels of an nth frame, $V_c$ is an MV from the nth frame to the $(n-1)^{th}$ frame, and $V_p$ is an MV allocated to adjacent pixels.

7. The method of claim 6, wherein a hole is generated in the frame to be obtained by interpolating the adjacent frames due to the occlusion region, and the determining of the pixel values comprises combining an MV estimated by one directional ME and an MV allocated to a previous block to restore the hole as an image.

8. The method of claim 6, wherein the determining of the pixel values comprises determining an MV of a greater component as the MV allocated to the adjacent pixels after comparing horizontal and vertical components of an MV of the adjacent pixels.

9. An adaptive motion compensated interpolating apparatus comprising:
a frame buffer which stores a predetermined number of frames of an input image signal;
an ME unit which performs one directional ME between an $(n-1)^{th}$ frame and an $n^{th}$ frame stored in the frame buffer to generate MVs;
an MV gradient detector which detects gradients of the MVs estimated by the ME unit; and
a motion compensated (MC) interpolator which generates pixel values to be obtained by interpolating the two frames by classifying pixels of the two frames into a plurality of image regions according to the MV gradients detected by the MV gradient detector and estimating the image region to which the pixels belong and determining weights of the pixels matched between the frames according to each image region.

10. The apparatus of claim 9, wherein the MC interpolator comprises:
an MV analyzer which analyzes the MV gradients;
an image region classifier which classifies the pixels into a uniform region, a non-uniform region, an uncovering region, and an occlusion region according to the MV gradients analyzed by the MV analyzer; and
an adaptive interpolator which generates a frame including the pixel values to be obtained by interpolating the $(n-1)^{th}$ frame and the $n^{th}$ frame by adaptively selecting pixels matched between the two frames, the MV estimated between the two frames, and at least another MV allocated to adjacent pixels according to the image regions classified by the image region classifier.

11. The apparatus of claim 10, wherein the at least another MV allocated to adjacent pixels is applied to restore a hole generated in the frame to be obtained by interpolating the two frames due to the occlusion region.

12. A non-transitory computer readable medium encoded with processing instructions for implementing an adaptive motion compensated interpolating method performed by a computer, the method comprising:
estimating motion vectors by performing block-based motion estimation between adjacent frames;
calculating gradients of the estimated motion vectors;
classifying pixels of each of the adjacent frames into a plurality of image regions according to the gradients of the estimated motion vectors; and
determining pixel values to be obtained by interpolation between the adjacent frames by adaptively selecting pixels matched between the adjacent frames for each classified image region.

13. The non-transitory computer readable medium of claim 12, wherein the determining of the pixel values comprises determining the pixel values according to a weight of pixel matching between the frames for each image region.

* * * * *